United States Patent
Itamoto

(10) Patent No.: US 9,270,213 B2
(45) Date of Patent: Feb. 23, 2016

(54) MOTOR CONTROL DEVICE

(71) Applicant: JTEKT Corporation, Osaka-shi, Osaka (JP)

(72) Inventor: Hidenori Itamoto, Tajami (JP)

(73) Assignee: JTEKT CORPORATION, Osaka-shi (JP)

( * ) Notice: Subject to any disclaimer, the term of this patent is extended or adjusted under 35 U.S.C. 154(b) by 6 days.

(21) Appl. No.: 14/230,599

(22) Filed: Mar. 31, 2014

(65) Prior Publication Data

US 2014/0300305 A1  Oct. 9, 2014

(30) Foreign Application Priority Data

Apr. 4, 2013 (JP) .................................. 2013-078760

(51) Int. Cl.
| | |
|---|---|
| H02P 1/04 | (2006.01) |
| H02H 7/08 | (2006.01) |
| G05B 5/00 | (2006.01) |
| H02P 6/12 | (2006.01) |
| B62D 5/04 | (2006.01) |
| H02P 29/02 | (2006.01) |

(52) U.S. Cl.
CPC ............... *H02P 6/12* (2013.01); *B62D 5/0487* (2013.01); *H02P 29/023* (2013.01)

(58) Field of Classification Search
CPC ............................. B62D 5/0487; H02P 29/021
USPC ................................ 318/474, 400.21, 400.22
See application file for complete search history.

(56) References Cited

U.S. PATENT DOCUMENTS

| | | | |
|---|---|---|---|
| 2005/0156548 A1* | 7/2005 | Kawada ......................... 318/432 |
| 2006/0181819 A1* | 8/2006 | Nomura et al. .................. 361/31 |
| 2009/0021207 A1* | 1/2009 | Kezobo et al. ................ 318/798 |
| 2009/0073617 A1* | 3/2009 | Gunji .............................. 361/23 |
| 2011/0248657 A1* | 10/2011 | Endoh ....................... 318/400.22 |
| 2012/0176069 A1 | 7/2012 | Sagami et al. |

FOREIGN PATENT DOCUMENTS

| | | |
|---|---|---|
| EP | 2 518 894 A2 | 10/2012 |
| JP | B2-4348897 | 10/2009 |

OTHER PUBLICATIONS

Dec. 8, 2015 Search Report issued in European Patent Application No. 14162992.3.

* cited by examiner

*Primary Examiner* — Erick Glass
(74) *Attorney, Agent, or Firm* — Oliff PLC

(57) ABSTRACT

A motor control device includes a drive circuit that supplies drive electric power in three phases to a motor, according to turning on or off of FETs; a microcomputer that generates control signals for turning on or off the FETs. The microcomputer detects a current-carrying failure in a U phase when all of (i) a condition that an absolute value of a U phase current value is less than a current determination value, (ii) a condition that a duty value corresponding to the U phase voltage command value is equal to or greater than a first duty determination value, or equal to or less than a second duty determination value; and (iii) a condition that the U phase voltage command value is deviated from the V phase and W phase voltage command values are satisfied.

6 Claims, 9 Drawing Sheets

MOTOR CONTROL DEVICE

INCORPORATION BY REFERENCE

The disclosure of Japanese Patent Application No. 2013-078760 filed on Apr. 4, 2013 including the specification, drawings and abstract, is incorporated herein by reference in its entirety.

BACKGROUND OF THE INVENTION

1. Field of the Invention

The invention relates to a motor control device that controls driving of a motor.

2. Description of Related Art

An electric power steering system is known in which a steering operation performed by a driver is assisted by applying a torque generated by a motor to a steering shaft or a rack shaft of a vehicle as an assist torque. The electric power steering system includes a motor control device that controls driving of the motor, based on a steering torque applied to a steering mechanism. The motor control device includes a drive circuit that supplies drive electric power in three phases to the motor, according to turning on or off of switching elements disposed on feeding paths for phases (a U phase, a V phase, a W phase) for the motor, and a microcomputer that generates control signals for turning on or off the switching elements of the drive circuit. The microcomputer computes current command values corresponding to a target output of the motor, based on the steering torque. The microcomputer computes voltage command values of the phases for the motor by performing current feedback control that causes current values of the phases for the motor to follow the current command values, and generates the control signals based on the voltage command values of the phases.

In such a motor control device, when abnormality such as breakage occurs in one of the phase feeding paths for the motor, various types of fail-safe control such as two-phase drive control may be performed. When breakage abnormality occurs, it is necessary to determine which one of the phase feeding paths is a faulty phase, in order to perform the fail-safe control. A conventional motor control device that is able to detect the faulty phase is described in the publication of Japanese Patent No. 4348897. A detection principle is as follows.

When abnormality such as breakage occurs in one of the phase feeding paths, a current value of the faulty phase in which the abnormality occurs is held at zero. Therefore, the current value of the faulty phase is likely to deviate from the current command value. Accordingly, the voltage command value of the faulty phase is likely to remain at an upper limit value or a lower limit value while a motor rotation angle changes. In the motor control device described in Japanese Patent No. 4348897, a focus is placed on this feature, and when one of the three phases is set as a specific phase, it is determined that a current-carrying failure occurs in the specific phase, on the condition that the current value of the specific phase is less than a predetermined current determination value, and the voltage command value of the specific phase exceeds a predetermined voltage command determination value.

When abnormality such as breakage occurs in one of the phase feeding paths, the current values of two phases, which are normal and are other than the faulty phase in which the abnormality occurs, are also changed, and therefore, the current values of the two normal phases are likely to deviate from the current command values. Therefore, the voltage command values of the two normal phases may change in the vicinity of the upper limit value or in the vicinity of the lower limit value while the motor rotation angle changes. Thus, in the motor control device described in Japanese Patent No. 4348897, if the current value of the normal phase is less than a predetermined value when the voltage command value of the normal phase is a value in the vicinity of the upper limit value or in the vicinity of the lower limit value, there is a possibility that the normal phase may be erroneously determined as the faulty phase and this erroneous detection of the faulty phase is undesirable.

SUMMARY OF THE INVENTION

An object of the invention is to provide a motor control device that detects a faulty phase more accurately.

A motor control device according to an aspect of the invention includes a drive circuit that supplies drive electric power in three phases to a motor, according to turning on or off of switching elements disposed in phase feeding paths for the motor; a control unit that computes voltage command values of the three phases for the motor through current feedback control that causes current values of the three phases for the motor to follow current command values corresponding to a target output of the motor, and generates control signals for turning on or off the switching elements, based on the voltage command values of the three phases; and an abnormality detecting portion. When one of the three phases is set as a specific phase, the abnormality detecting portion determines that a current-carrying failure occurs in the specific phase on a condition that all of (i) a condition that an absolute value of the current value of the specific phase is less than a predetermined first current determination value, (ii) a condition that an absolute value of the voltage command value of the specific phase is equal to or greater than a predetermined voltage command determination value, and (iii) a condition that the voltage command value of the specific phase is deviated from the voltage command values of two phases other than the specific phase are satisfied.

It has been confirmed, through an experiment conducted by the inventor, that the voltage command value of a faulty phase remains at an upper limit value or a lower limit value while a motor rotation angle changes, the voltage command values of two phases, which are normal and are other than the faulty phase, change in the following manner. When the voltage command value of the faulty phase remains at the upper limit value, the voltage command values of the two normal phases change in the vicinity of the lower limit value. When the voltage command value of the faulty phase remains at the lower limit value, the voltage command values of the two normal phases change in the vicinity of the upper limit value. That is, when the voltage command value of the faulty phase remains at the upper limit value or the lower limit value, the voltage command values of the two normal phases change so that the voltage command values of the two normal phases are deviated from the voltage command value of the faulty phase. Accordingly, when one of the three phases is set as the specific phase, and a determination as to whether there is the current-carrying failure is performed for only the specific phase in a situation in which the voltage command value of the specific phase is deviated from the voltage command values of the two phases other than the specific phase, it is possible to accurately detect the current-carrying failure in the specific phase, and to prevent erroneous detection of the current-carrying failure in the two phases other than the specific phase. Thus, in the above-mentioned configuration, it is possible to more accurately detect the faulty phase.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
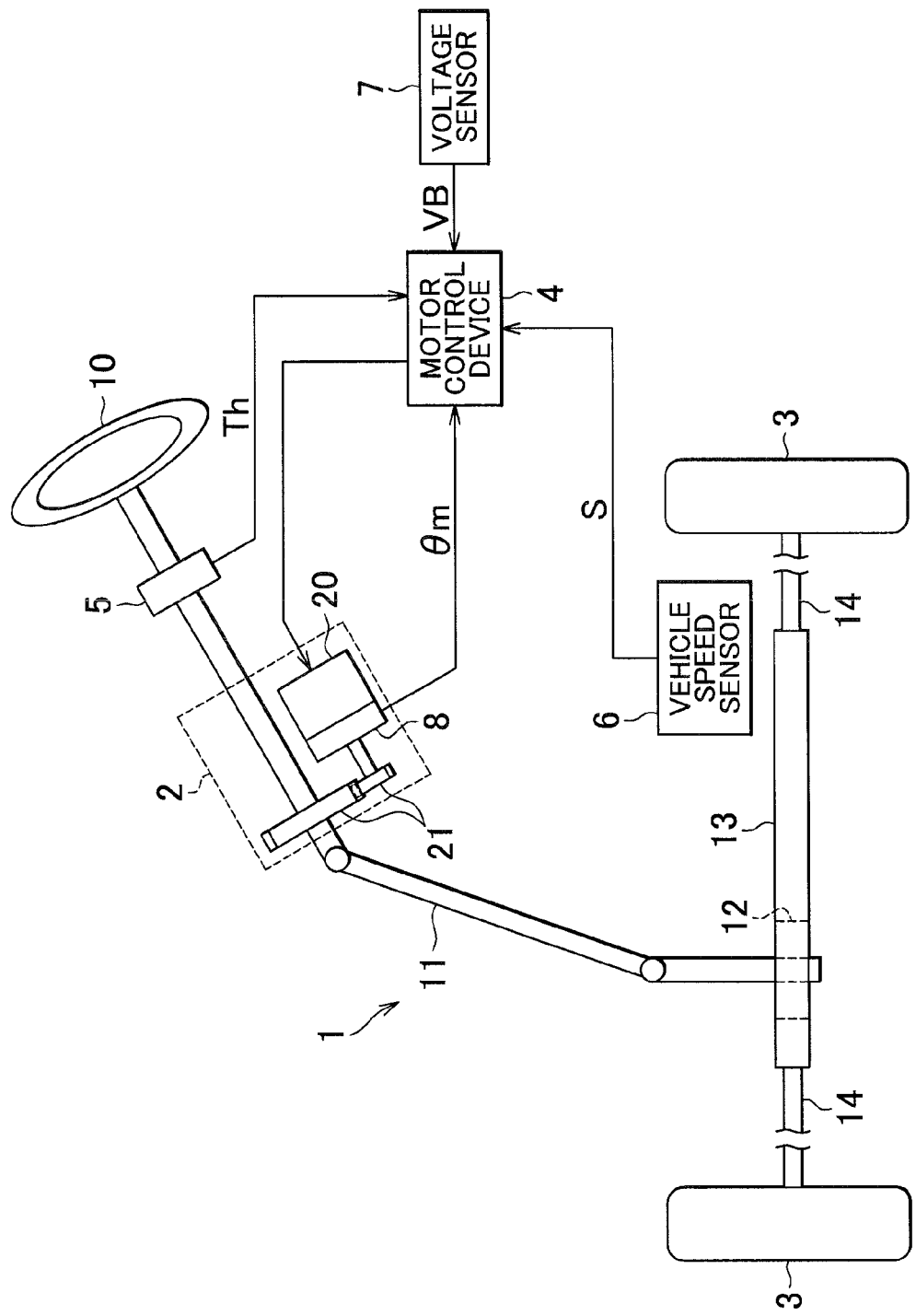
FIG. 1 is a block diagram illustrating a schematic configuration of an electric power steering system.

Hereinafter, a motor control device according to an embodiment of the invention will be described. First, a schematic configuration of an electric power steering system to which the motor control device of the embodiment is applied will be described. As illustrated in FIG. 1, the electric power steering system includes a steering mechanism 1 that steers steered wheels 3, based on an operation of a steering wheel 10 performed by a driver, and an assist mechanism 2 that assists the steering operation performed by the driver.

The steering mechanism 1 includes a steering shaft 11 that is a rotation shaft of the steering wheel 10 and a rack shaft 13 that is connected to a lower end portion of the steering shaft 11 through a rack and pinion mechanism 12. In the steering mechanism 1, when the steering shaft 11 rotates according to the operation of the steering wheel 10 performed by the driver, a rotational motion thereof is converted to a reciprocating linear motion of the rack shaft 13 in an axial direction through the rack and pinion mechanism 12. The reciprocating linear motion of the rack shaft 13 is transmitted to the steered wheels 3 through tie rods 14 connected to respective ends of the rack shaft 13 so that a steered angle of the steered wheels 3 is changed and a traveling direction of a vehicle is changed.

The assist mechanism 2 includes a motor 20. The motor 20 generates an assist torque. The assist torque is applied to the steering shaft 11. The motor 20 is constituted by a three-phase brushless motor. A motor torque is applied to the steering shaft 11 and the steering operation is assisted when the rotation of the motor 20 is transmitted to the steering shaft 11 through a speed reducer 21

In the electric power steering system, there are provided various sensors that detect an operation quantity of the steering wheel 10 and a vehicle state quantity. For example, a torque sensor 5 is provided on the steering shaft 11. The torque sensor 5 detects a torque (a steering torque) Th applied to the steering shaft 11 when the steering operation is performed by the driver. In the vehicle, there are provided a vehicle speed sensor 6 that detects a vehicle speed S of the vehicle, and a voltage sensor 7 that detects a voltage VB of a vehicle-mounted battery. The motor 20 is provided with a rotation angle sensor 8 that detects a rotation angle (electrical angle) θm of the motor 20. Output signals of the sensors 5 to 8 are taken into a motor control device 4. The motor control device 4 controls driving of the motor 20, based on the output signals of the sensors 5 to 8.

Figure 2:
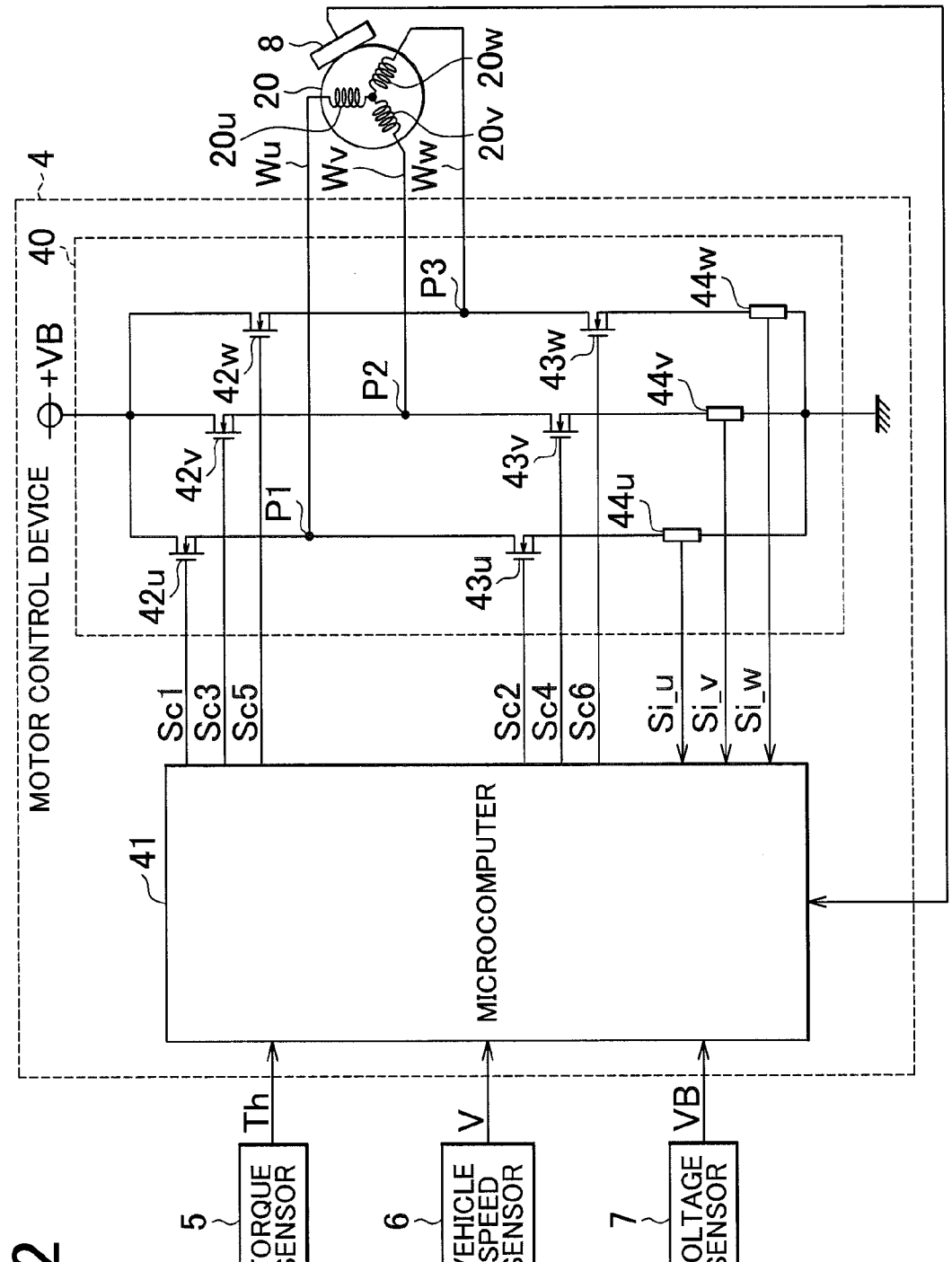
FIG. 2 is a block diagram illustrating a configuration of a motor control device according to an embodiment.

As illustrated in FIG. 2, the motor control device 4 includes a drive circuit 40 that converts DC power supplied from the vehicle-mounted battery (power supply voltage+VB) to AC power in three-phases (U phase, V phase, W phase), and a microcomputer 41 that drives the drive circuit 40 through pulse width modulation (PWM) as a control unit.

The drive circuit 40 has a structure in which a series circuit of a pair of a FET 42u and a FET 43u, a series circuit of a pair of a FET 42v and a FET 43v, and a series circuit of a pair of a FET 42w and a FET 43w are connected in parallel. Phase motor coils 20u to 20w of the motor 20 are connected to a connection point P1 of the FET 42u and the FET 43u, a connection point P2 of the FET 42v and the FET 43v, and a connection point P3 of the FET 42w and the FET 43w through feeding lines Wu to Ww, respectively. In the drive circuit 40, the DC power supplied from the power supply is converted to the three-phase AC power by turning on or off each of the FETs 42u to 42w and 43u to 43w, based on control signals Sc1 to Sc6 from the microcomputer 41.

Figure 3:
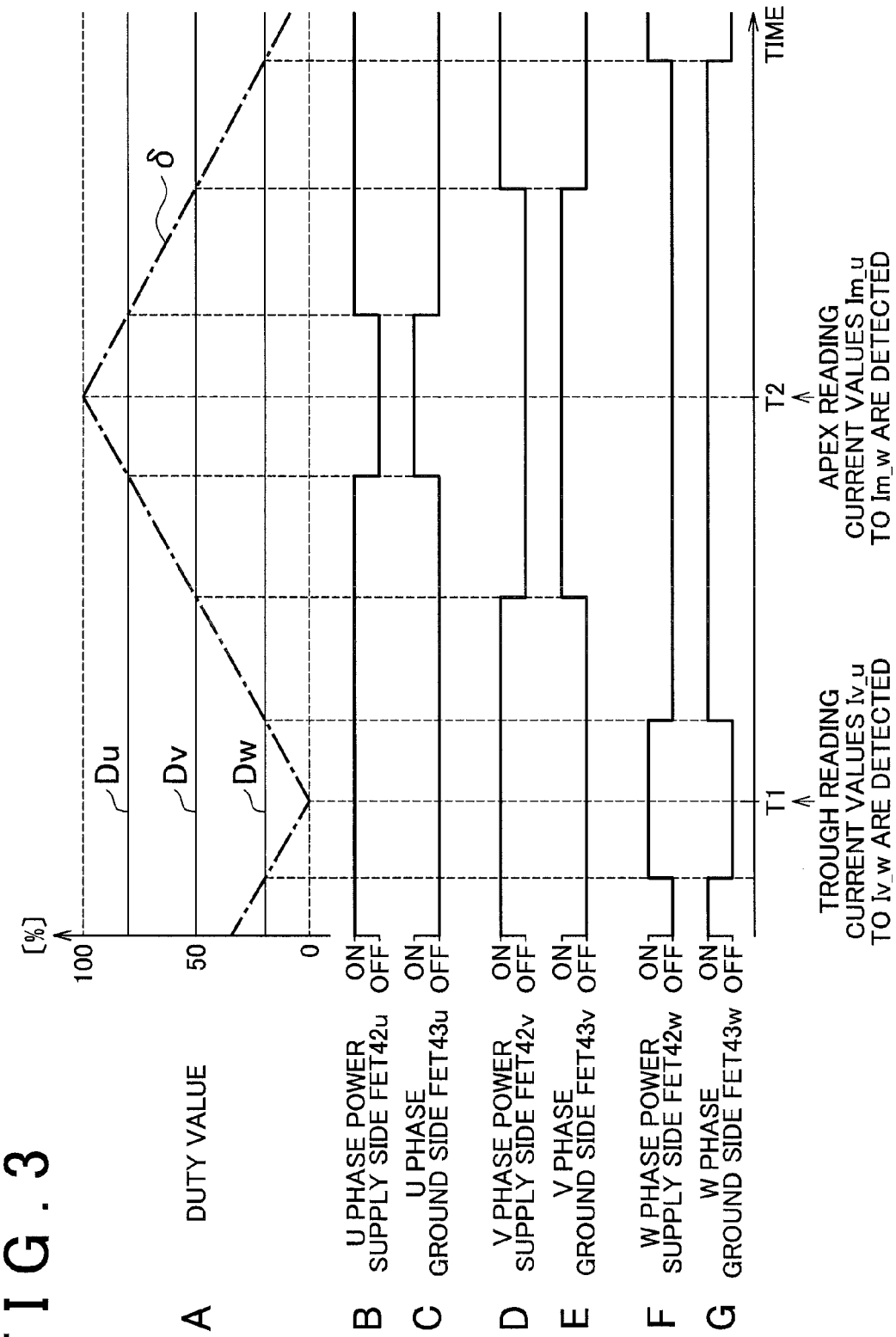
FIG. 3 is a diagram including an A part that is a time chart illustrating changes in duty values and a triangular wave, and B to G parts each of which is a time chart illustrating changes in on/off states of an upper FET and a lower FET for each phase.

More specifically, as illustrated by A part to G part in FIG. 3, the microcomputer 41 generates the control signals Sc1 to Sc6, based on a comparison between each of duty values Du to Dw corresponding to respective phase voltages to be applied to the respective phase motor coils 20u to 20w, and a triangular wave δ that is a PWM carrier (carrier wave). That is, the microcomputer 41 generates the control signals Sc1, Sc3, Sc5 so that when each of the duty values Du to Dw becomes greater than the triangular wave δ, a corresponding one of the FETs 42u to 42w on the power supply side for the corresponding phase is turned ON, and when each of the duty values Du to Dw becomes smaller than the triangular wave δ, a corresponding one of the FETs 42u to 42w on the power supply side for the corresponding phase is turned OFF. The microcomputer 41 generates the control signals Sc2, Sc4, Sc6 so that when each of the duty values Du to Dw becomes smaller than the triangular wave δ, a corresponding one of the FETs 43u to 43w on the ground side for the corresponding phase is turned ON, and when each of the duty values Du to Dw becomes greater than the triangular wave δ, a corresponding one of the FETs 43u to 43w on the ground side for the corresponding phase is turned OFF. The DC power supplied from the power supply is converted to the three-phase AC power by turning on or off each of the FETs 42u to 42w and 43u to 43w, based on the control signals Sc1 to Sc6 generated as described above.

As illustrated in FIG. 2, current sensors 44u to 44w corresponding to respective phases are provided in ground lines for the FETs 43u to 43w, respectively. Each of the current sensors 44u to 44w has a known configuration in which an output is produced by amplifying a voltage between terminals of a shunt resistor connected in series to a corresponding one of the FETs 43u to 43w. Output signals Si_u to Si_w of the current sensors 44u to 44w are taken into the microcomputer 41. The microcomputer 41 acquires the output signals Si_u to Si_w of the current sensors 44u to 44w at predetermined sampling timings, and computes motor current values Iu to Iw for respective phases. More specifically, as illustrated by A part in FIG. 3, the microcomputer 41 acquires the output signals Si_u to Si_w of the current sensors 44u to 44w at timing T1 corresponding to a trough of the triangular wave δ and at timing T2 corresponding to an apex of the triangular wave δ. The timing T1 corresponding to the trough is a peak timing at which a value of the triangular wave δ becomes the minimum, that is, a timing at which all of the FETs 42u to 42w on the power supply side are in the ON state and all of the FETs 43u to 43w on the ground side are in the OFF state. On the other hand, the timing T2 corresponding to the apex is a peak timing at which the value of the triangular wave δ becomes the maximum, that is, a timing at which all of the FETs 42u to 42w on the power supply side are in the OFF state and all of the FETs 43u to 43w on the ground side are in the ON state.

The microcomputer 41 detects trough reading current values Iv_u to Iv_w, based on the output signals Si_u to Si_w acquired at the timing T1 corresponding to the trough of the triangular wave δ. The microcomputer 41 detects apex reading current values Im_u to Im_w, based on the output signals Si_u to Si_w acquired at the timing T2 corresponding to the apex of the triangular wave δ. The microcomputer 41 computes phase current values Iu to Iw, based on the trough reading current values Iv_u to Iv_w and the apex reading current values Im_u to Im_w that are detected, according to the following Equations (1) to (3).

$$Iu = Im\_u - Iv\_u \quad (1)$$

$$Iv = Im\_v - Iv\_v \quad (2)$$

$$Iw = Im\_w - Iv\_w \quad (3)$$

The microcomputer 41 generates the control signals Sc1 to Sc6, based on the phase current values Iu to Iw that are computed, and the steering torque Th, the vehicle speed S, and the motor rotation angle θm detected by the sensors 5, 6, 8. That is, the microcomputer 41 converts the phase current values Iu to Iw to a d-axis current value and a q-axis current value of a d/q coordinate system, based on the motor rotation angle θm. The microcomputer 41 computes the q-axis current command value corresponding to a target output of the motor 20, that is, corresponding to a target value of the assist torque to be applied to the steering mechanism 1, based on the steering torque Th and the vehicle speed S. For example, the microcomputer 41 sets an absolute value of the q-axis current command value so that the absolute value of the q-axis current command value increases as an absolute value of the steering torque Th increases and as the vehicle speed S decreases. The microcomputer 41 sets the d-axis current command value to zero. The microcomputer 41 computes voltage command values of the d/q coordinate system by performing current feedback control so that the d-axis current value follows the d-axis current command value and the q-axis current value follows the q-axis current command value. Next, the microcomputer 41 computes phase voltage command values Vu* to Vw* of a three-phase coordinate system by inversely converting the voltage command values of the d/q coordinate system that are computed, and obtains phase duty values Du to Dw, based on the phase voltage command values Vu* to Vw* that are computed. The phase duty values Du to Dw change in a substantially sine waveform with respect to the motor rotation angle θm. The phase of the wave of the V phase duty value Dv is shifted by 120° from the phase of the wave of the U phase duty value Du with respect to the motor rotation angle θm. The phase of the wave of the W phase duty value Dw is shifted by 240° from the phase of the wave of the U phase duty value Du with respect to the motor rotation angle θm. As illustrated in FIG. 3, the microcomputer 41 generates the control signals Sc1 to Sc6 by comparing the phase duty values Du to Dw with the triangular wave 6, and outputs the generated control signals Sc1 to Sc6 to the drive circuit 40. Thus, drive electric power for generating a target assist torque is supplied to the motor 20 and assist control is performed.

The microcomputer 41 detects a current-carrying failure of each of phase feeding paths for the motor 20, based on a corresponding one of the phase current values Iu to and a corresponding one of the phase duty values Du to Dw. As described above, the microcomputer 41 also functions as an abnormality detecting portion that detects the current-carrying failure. Each of the phase feeding paths indicates a portion constituted by the series circuit of the pair of FETs and a feeding line for the phase. For example, the U phase feeding path indicates a portion constituted by the series circuit of the FET 42u and the FET 43u, and the U phase feeding line Wu. The current-carrying failure in each of the phase feeding paths is, for example, an open fault of each of the FETs 42u to 42w and 43u to 43w, or breakage of each of the feeding lines Wu to Ww.

Figure 4:
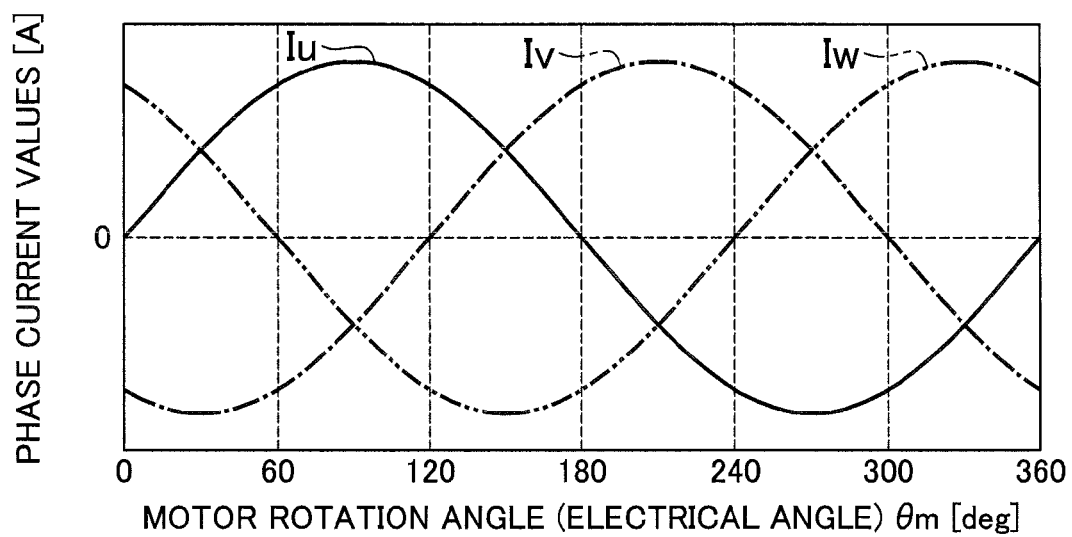
FIG. 4 is a graph illustrating a relation between a motor rotation angle (electrical angle) and phase current values when there is no current-carrying failure in each of phase feeding paths.
Figure 5:
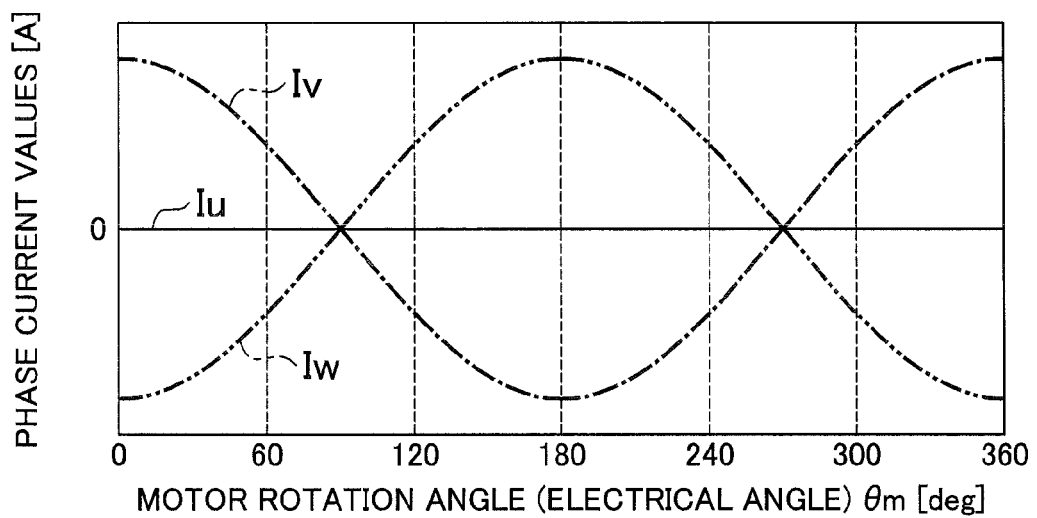
FIG. 5 is a graph illustrating a relation between the motor rotation angle (electrical angle) and the phase current values when a current-carrying failure occurs in a U phase feeding path.
Figure 6:
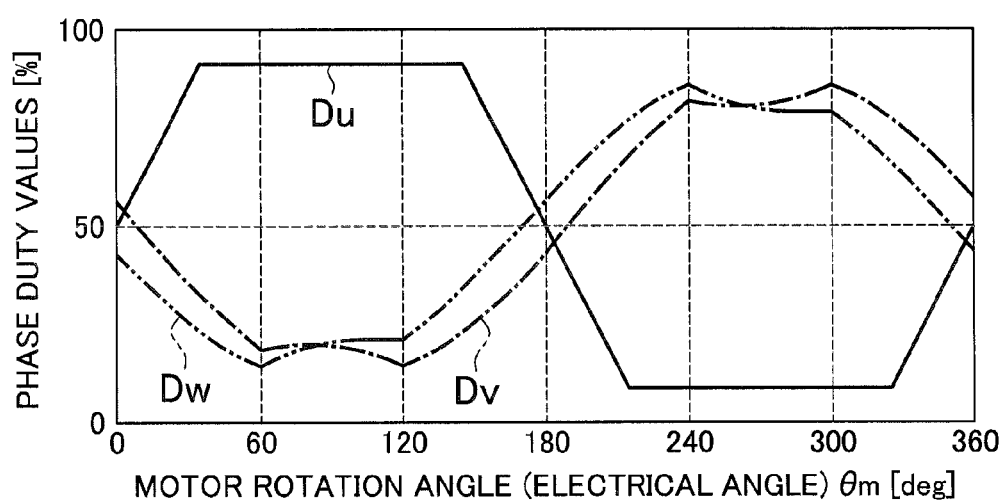
FIG. 6 is a graph illustrating a relation between the motor rotation angle (electrical angle) and phase duty values when the current-carrying failure occurs in the U phase feeding path.

Detection principle of the current-carrying failure in the embodiment will be described. As illustrated in FIG. 4, if there is no current-carrying failure in each of the phase feeding paths, the phase current values Iu to Iw are changed in the sine waveforms in a manner such that the phases of the waves of the phase current values Iu to Iw are shifted by 120° from each other with respect to the motor rotation angle θm. On the other hand, for example, if the open fault occurs in the U phase FET 43u illustrated in FIG. 2, the current-carrying failure occurs in the U phase and the U phase current value Iu is held at zero. At this time, as illustrated in FIG. 5, the V phase and W phase current values Iv, Iw, which are normal, are changed in the sine waveforms in a manner such that the phases of the waves of the V phase and W phase current values Iv, Iw are shifted by 180° from each other with respect to the motor rotation angle θm. If the phase current values Iu to Iw are changed as illustrated in FIG. 5, deviation between the d-axis current value and the d-axis current command value, and deviation between the q-axis current value and the q-axis current command value are likely to be increased due to the above-described changes of the phase current values Iu to Iw. Therefore, each of the phase duty values Du to Dw is likely to be set to the upper limit value or the lower limit value. For more details, as illustrated in FIG. 6, the U phase duty value Du remains at the upper limit value or the lower limit value with respect to the motor rotation angle θm. When the U phase duty value Du remains at the upper limit value, the V phase duty value Dv and the W phase duty value Dw change in the vicinity of the lower limit value, and when the U phase duty value Du remains at the lower limit value, the V phase duty value Dv and the W phase duty value Dw change in the vicinity of the upper limit value. Therefore, in the case where one of the three phases is set as a specific phase, and it is determined that the current-carrying failure occurs in the specific phase when only the condition that the current value of the specific phase is lower than a predetermined current determination value and the condition that the duty value of the specific phase is the upper limit value or the lower limit value are satisfied as in the motor control device of the related art, there is a possibility that a normal phase may be erroneously determined as a faulty phase. That is, in the case where this determination method is used, the phase duty values Dv, Dw become values in the vicinity of the upper limit value or in the vicinity of the lower limit value when both the V phase and W phase current values Iv, Iw, which are normal, become values in the vicinity of zero, as illustrated in FIGS. 5 and 6. Therefore, there is a possibility that the normal phase may be erroneously determined as the faulty phase.

When a focus is placed on a change manner of each of the phase duty values Du to Dw illustrated in FIG. 6, it is found that when the U phase duty value Du corresponding to the faulty phase remains at the upper limit value or the lower limit value the U phase duty value Du is deviated from the duty values Dv, Dw other than the U phase duty value Du. Therefore, if a determination as to whether there is the current-carrying failure is performed for only the U phase when the U phase duty value Du is deviated from the duty values Dv, Dw other than the U phase duty value Du, it is possible to accurately detect the current-carrying failure in the U phase and it is possible to prevent erroneous detection of the current-carrying failure in the V phase and the W phase. Similarly, if a determination as to whether there is the current-carrying failure is performed for only the V phase when the V phase duty value Dv is deviated from the duty values Dw, Du other than the V phase duty value Dv, it is possible to accurately detect the current-carrying failure in the V phase and it is possible to prevent erroneous detection of the current-carrying failure in the W phase and the U phase. The same applies to the detection of the current-carrying failure in the W phase. In the embodiment, the current-carrying failure in each phase is detected using this principle.

Current-carrying failure detection processing for each phase, which is performed by the microcomputer 41, and effects thereof will be described with reference to FIG. 7. Since the current-carrying failure detection processing for each phase is basically similar processing except for a difference in the detection phase, hereinafter, for the sake of convenience, only the current-carrying failure detection processing for the U phase will be described as a representative.

Figure 7:
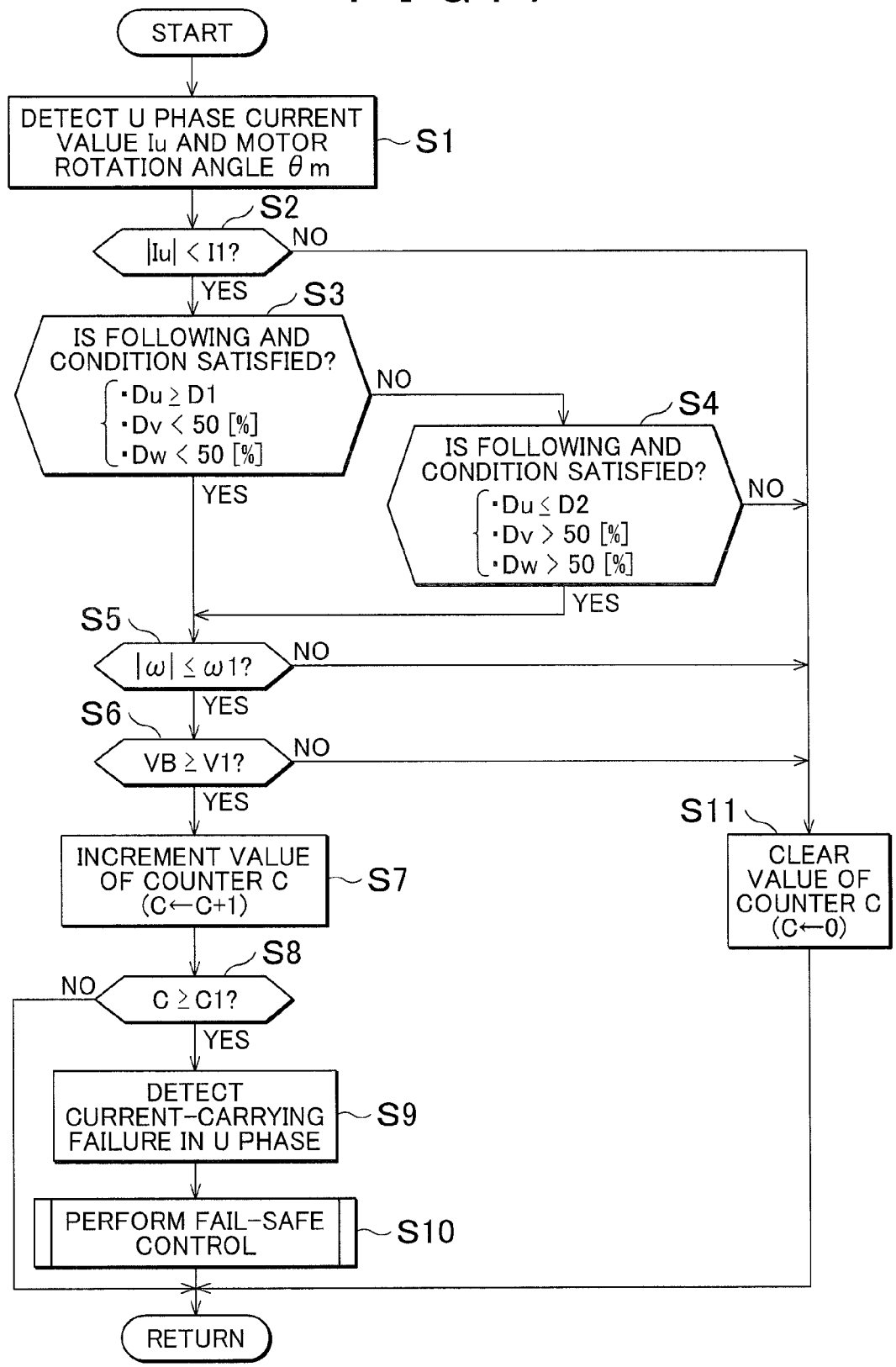
FIG. 7 is a flowchart illustrating a procedure of current-carrying failure detection processing for a U phase performed by the motor control device according to the embodiment.

As illustrated in FIG. 7, first, the microcomputer 41 detects the U phase current value Iu and the motor rotation angle θm (step S1) and determines whether or not the absolute value |Iu| of the U phase current value is less than a predetermined current determination value I1 (step S2). The predetermined current determination value I1 is set a value based on which it can be determined that the current-carrying failure occurs in the U phase. The predetermined current determination value I1 is set in advance through an experiment or the like, taking into account N-T characteristics of the motor 20. In the embodiment, the current determination value I1 that is set for the absolute value |Iu| of the U phase current value is a first current determination value. When the absolute value |Iu| of the U phase current value is less than the predetermined current determination value I1 (step S2: YES), the microcomputer 41 determines whether or not the AND condition (conjunction condition) of the following (a1) to (a3) conditions is satisfied, based on each of the phase duty values Du to Dw at that point (step S3).

(a1) The U phase duty value Du is equal to or greater than a first duty determination value D1. The first duty determination value D1 is set to a value (for example, 85(%)) based on which it can be determined that the U phase duty value Du remains at the upper limit value.

(a2) The V phase duty value Dv is less than "50(%)". (a3) The W phase duty value Dw is less than "50(%)". As described above, the determination processing of step S3 is processing that determines whether or not the U phase duty value Du is the upper limit value and the U phase duty value Du is deviated from the duty values Dv, Dw other than the U phase duty value Du.

When the AND condition of the (a1) to (a3) conditions is not satisfied (step S3: No), it is determined whether or not the AND condition of the following (b1) to (b3) conditions is satisfied (step S4).

(b1) The U phase duty value Du is equal to or less than a second duty determination value D2. The second duty determination value D2 is set to a value (for example, 15(%)) based on which it can be determined that the U phase duty value Du remains at the lower limit value.

(b2) The V phase duty value Dv is greater than "50(%)". (b3) The W phase duty value Dw is greater than "50(%)". As described above, the determination processing of step S4 is processing that determines whether or not the U phase duty value Du is the lower limit value and the U phase duty value Du is deviated from the duty values Dv, Dw other than the U phase duty value Du.

There is a correlation between the phase duty values Du to Dw and the phase voltage command values Vu* to Vw*, the (a1) to (a3) conditions correspond to the following (a1') to (a3') conditions, respectively.

(a1') The U phase voltage command value Vu* is a positive value and an absolute value Vu* thereof is equal to or greater than a predetermined voltage command determination value (>0). (a2') The V phase voltage command value Vv* is a negative value. (a3') The W phase voltage command value Vw* is a negative value.

The (b1) to (b3) conditions correspond to the following (b1') to (b3') conditions, respectively.

(b1') The U phase voltage command value Vu* is a negative value and the absolute value |Vu| thereof is equal to or greater than a predetermined voltage command determination value (>0). (b2') The V phase voltage command value Vv* is a positive value. (b3') The W phase voltage command value Vw* is a positive value.

As described above, the determination processing of steps S3 and S4 corresponds to processing that determines whether or not the absolute value |Vu*| of the U phase voltage command value is equal to or greater than a predetermined voltage command determination value, and the positive or negative sign of the U phase voltage command value Vu* is different from the positive or negative sign of the voltage command values Vv*, Vw* other than the U phase voltage command value Vu*. Comparison among the positive or negative signs of the phase voltage command values Vu* to Vw*, corresponds to processing that determines whether or not the U phase voltage command value Vu* is deviated from the voltage command values Vv*, Vw* other than the U phase voltage command value Vu*.

When the AND condition of the (a1) to (a3) conditions is satisfied (step S3: YES), or when the AND condition of the (b1) to (b3) conditions is satisfied (step S4: YES), the microcomputer 41 determines whether or not an absolute value |ω| of a motor angular velocity is equal to or lower than a predetermined angular velocity determination value ω1 (step S5). This processing is performed due to the following reason.

If the motor angular velocity increases, a counter electromotive force of the motor 20 increases. This reduces the absolute values |Iu| to |Iw| of the phase current values. Therefore, in a situation where the motor angular velocity is high, the absolute value |Iu| of the U phase current value may become less than the predetermined current determination value I1 in spite of the fact that there is no breakage in the U phase feeding path. Thus, there is a possibility that the current-carrying failure in the U phase may be erroneously detected. In order to avoid the erroneous detection, in the embodiment, determination processing of step S5 is performed. The microcomputer 41 computes the motor angular velocity ω by obtaining a difference value between the motor rotation angle θm that is currently detected and the motor rotation angle θm that is previously detected, and by dividing the difference value by a computation period. A predetermined angular velocity determination value ω1 is set to a value based on which it can be determined that the motor angular velocity ω is a value at which the current-carrying failure in the U phase is not erroneously detected. The predetermined angular velocity determination value ω1 is set in advance through an experiment or the like.

When the absolute value |ω| of the motor angular velocity is equal to or lower than the predetermined angular velocity determination value ω1 (step S5: YES), the microcomputer 41 determines whether or not a battery voltage VB that is detected by the voltage sensor 7 is equal to or higher than a predetermined voltage determination value V1 (step S6). This processing is performed due to the following reason.

For example, when the battery voltage VB is reduced due to aging deterioration of the vehicle-mounted battery, the power supply voltage supplied to the drive circuit 40 is reduced. This also reduces the absolute values |Iu| to |Iw| of the phase current values. Therefore, in a situation where the battery voltage VB is reduced, the absolute value |Iu| of the U phase current value may become less than the predetermined current determination value I1 in spite of the fact that there is no breakage in the U phase feeding path. Therefore, there is a possibility that the current-carrying failure in the U phase may be erroneously detected. In order to avoid the erroneous detection, in the embodiment, determination processing of step S6 is performed. The predetermined voltage determination value V1 is set to a value based on which it can be determined that the battery voltage VB is a voltage at which the current-carrying failure in the U phase is not erroneously detected. The predetermined voltage determination value V1 is set in advance through an experiment or the like.

When the battery voltage VB is equal to or higher than the predetermined voltage determination value V1 (step S6: YES), the microcomputer 41 increments a value of a counter C (step S7), and then, the microcomputer 41 determines whether or not the value of the counter C is equal to or greater than a predetermined value C1 (step S8). An initial value of the counter C is set to zero. When the value of the counter C is less than the predetermined value C1 (step S8: NO), the microcomputer 41 ends a series of processing.

Thereafter, if the microcomputer 41 repeatedly performs the processing of steps S1 to S7 illustrated in FIG. 7 in a predetermined computation period, the value of the counter C reaches the predetermined value C1. At this time, if it is determined that the value of the counter C is equal to or greater than the predetermined value C1 (step S8: YES), the microcomputer 41 determines that the current-carrying failure occurs in the U phase (step S9) and performs fail-safe control (step S10). As the fail-safe control, for example, two-phase drive control or motor stop control is performed. In the two-phase drive control, the driving of the motor 20 is continued by feeding electric power to the motor 20 through the V phase and W phase feeding paths other than the U phase feeding path in which the current-carrying failure occurs. In the motor stop control, the motor 20 is stopped.

When a negative determination is made in one of steps S2, S4, S5, S6, the microcomputer 41 clears the value of the counter C (step S11), and ends a series of processing. With the configuration, when the current-carrying failure occurs in the U phase, it is possible to accurately detect the failure, and therefore, it is possible to accurately perform transition to the fail-safe control.

As illustrated in FIG. 5, in the motor control device 4 of the embodiment, it is possible to obtain a particularly great effect that the fault in the U phase can be detected when all of the phase current values including the current value Iu of the U phase that is the faulty phase and the V phase and W phase current values Iv, Iw of the normal phases become the values in the vicinity of zero. That is, if the phase current values Iu to Iw are changed as illustrated in FIG. 5 due to the current-carrying failure in the U phase, the motor 20 cannot be smoothly operated when the V phase and W phase current values Iv, Iw of the normal phases become the values in the vicinity of zero. In a situation in which the motor 20 cannot be smoothly operated, the state of the normal phase is similar to the state of the faulty phase. Therefore, the normal phase is likely to be erroneously determined as the faulty phase in the detection method of the related art. In this respect, in the motor control device 4 of the embodiment, it is possible to obtain the particularly large effect that only the U phase can be detected as the faulty phase in this situation.

The current-carrying failure detection processing for the V phase is processing in which the U phase, the V phase and the W phase illustrated in FIG. 7 are replaced by the V phase, the W phase and the U phase, respectively. The current-carrying failure detection processing for the W phase is processing in which the U phase, the V phase and the W phase illustrated in FIG. 7 are replaced by the W phase, the U phase and the V phase, respectively. The value of the counter C used in the current-carrying failure detection processing for each phase is counted individually in the corresponding processing performed by the microcomputer 41. In the current-carrying failure detection processing for the V phase and the W phase, it is possible to obtain the effects similar to the above-mentioned effects obtained in the current-carrying failure detection processing for the U phase.

As described above, the following advantageous effects are obtained in the motor control device 4 of the embodiment. When the absolute value |Iu| of U phase current value is less than the predetermined current determination value I1, the motor control device 4 determines that the current-carrying failure occurs in the U phase, on the condition that the AND condition of the (a1) to (a3) conditions or the AND condition of the (b1) to (b3) conditions is satisfied. That is, the motor control device 4 determines that the current-carrying failure occurs in the U phase, on the condition that the AND condition of the (a1') to (a3') conditions or the AND condition of the (b1') to (b3') conditions is satisfied when the absolute value |Iu| of the U phase current value is less than the predetermined current determination value I1. Thus, when one of the three phases is set as the specific phase, it is possible to accurately detect the current-carrying failure in the specific phase and it is possible to prevent erroneous detection of the current-carrying failure in the two phases other than the specific phase. Therefore, it is possible to further accurately detect the faulty phase.

The motor control device 4 determines that the current-carrying failure occurs in the specific phase on the further condition that the motor angular velocity ω is equal to or lower than the predetermined angular velocity determination value ω1. Therefore, it is possible to avoid the erroneous detection of the current-carrying failure.

The motor control device 4 determines that the current-carrying failure occurs in the specific phase on the further condition that the battery voltage VB is equal to or higher than the predetermined voltage determination value V1. Therefore, it is possible to avoid the erroneous detection of the current-carrying failure.

The embodiment described above can be implemented in the following manners. Hereinafter, for the sake of convenience, the features regarding the detection of the current-carrying failure, which are common to each phase, will be described for only the U phase as a representative. In the embodiment described above, the condition that the battery voltage VB is equal to or higher than the predetermined voltage determination value V1 is included in the conditions for determining that current-carrying failure occurs in the U phase. However, the condition may be omitted. That is, the processing of step S6 may be omitted in the processing illustrated in FIG. 7.

In the embodiment described above, the condition that the motor angular velocity ω is equal to or lower than the angular velocity determination value ω1 is included in the conditions for determining that the current-carrying failure occurs in the U phase. However, if the motor 20 is used only in a situation in which the motor angular velocity ω is equal to or lower than the angular velocity determination value ω1, the condition may be omitted. That is, the processing of step S5 may be omitted in the processing illustrated in FIG. 7.

Figure 8:
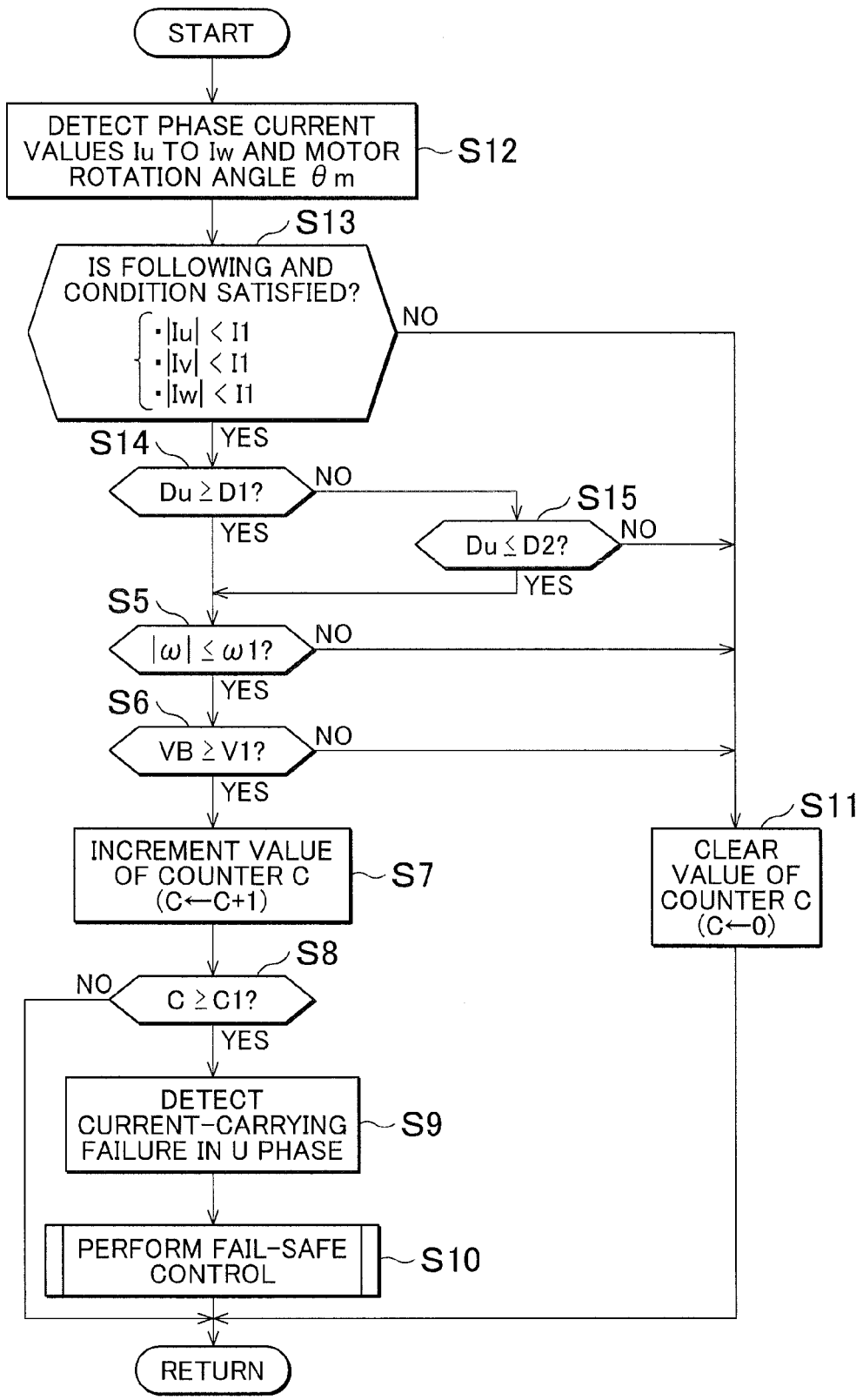
FIG. 8 is a flowchart illustrating a procedure of current-carrying failure detection processing for a U phase performed by a motor control device in a modified example.

As illustrated in FIGS. 5 and 6, the current values Iv, Iw of the V phase and the W phase become the values in the vicinity of zero when the U phase duty value Du is deviated from the duty values Dv, Dw other than the U phase duty value Du. Therefore, it can be determined whether or not the U phase duty value Du is deviated from the duty values Dv, Dw other than the U phase duty value Du, based on whether or not the current values Iv, Iw of the V phase and the W phase are less than the current determination value I1. By using this feature, the microcomputer 41 may perform processing of steps S12 to S15 illustrated in FIG. 8, instead of the processing of steps S1 to S4 illustrated in FIG. 7. That is, after each of the phase current values Iu to Iw and the motor rotation angle θm are detected (step S12), the microcomputer 41 determines whether or not all of the absolute values |Iu| to |Iw| of the phase current values are less than the current determination value I1 (step S13). The current determination value I1 that is set for the absolute values |Iv|, |Iw| of the current values of the V phase and the W phase is a second current determination value. When all of the absolute values |Iu| to |Iw| of the phase current values are less than the current determination value I1 (step S13: YES), the microcomputer 41 performs the processing of step S5 and subsequent steps, on the condition that the U phase duty value Du is equal to or greater than the first duty determination value D1 (step S14: YES). When the U phase duty value Du is less than the first duty determination value D1 (step S14: NO), the microcomputer 41 performs the processing of step S5 and subsequent steps, on the condition that the U phase duty value Du is equal to or less than the second duty determination value D2 (step S15: YES). In the configuration, it is possible to obtain the effects similar to the effects obtained in the embodiment described above.

Figure 9:
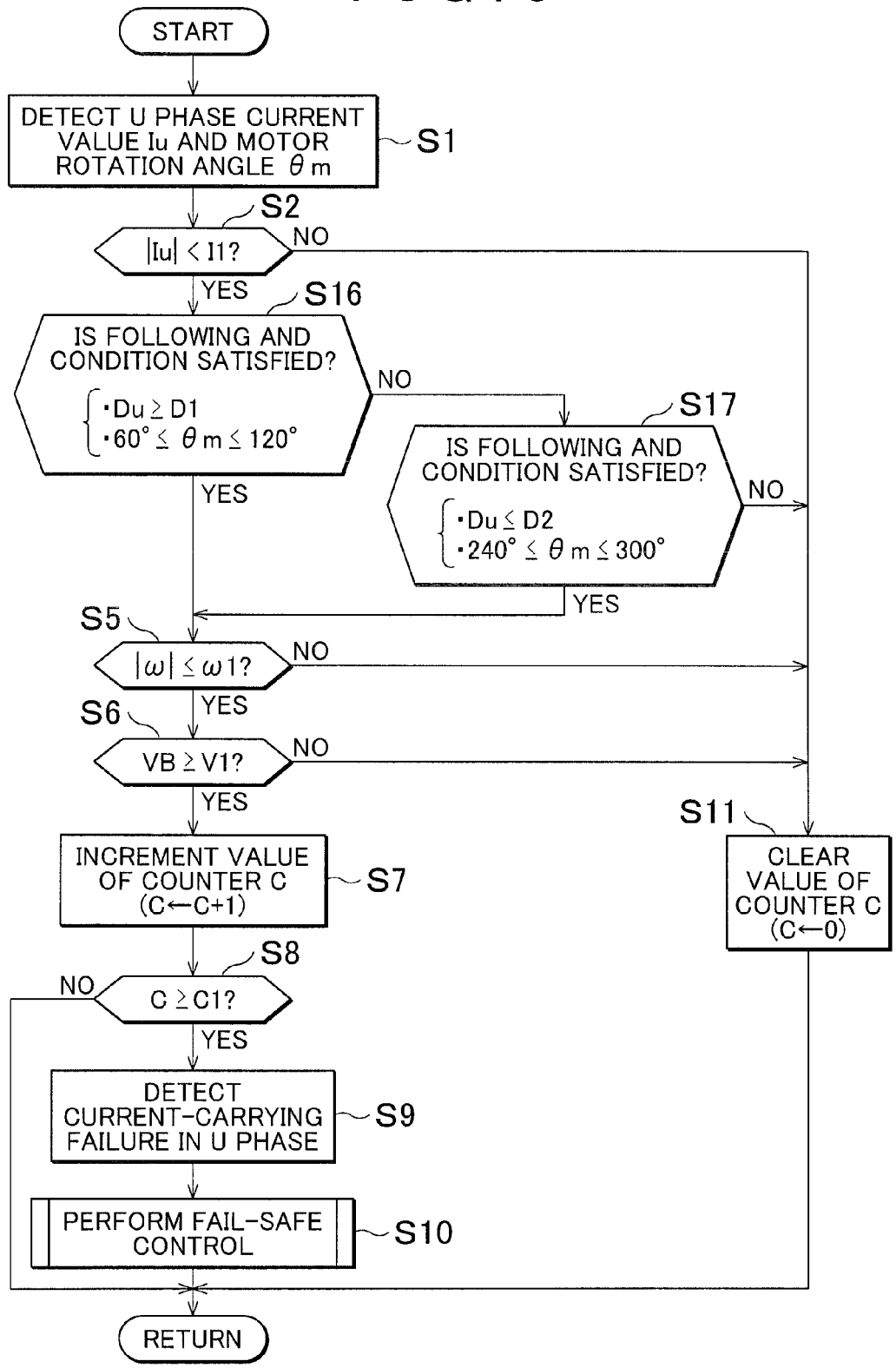
FIG. 9 is a flowchart illustrating a procedure of current-carrying failure detection processing for a U phase performed by a motor control device in another modified example.

As illustrated in FIGS. 5 and 6, when the U phase duty value Du is deviated from the duty values Dv, Dw other than the U phase duty value Du, the motor rotation angle θm is in a range of "60°≤θm≤120°", or a range of "240°θm≤300°". Therefore, it can be determined whether or not the U phase duty value Du is deviated from the duty values Dv, Dw other than the U phase duty value Du, based on the motor rotation angle θm. By using this feature, the microcomputer 41 may perform processing of steps S16, S17 illustrated in FIG. 9, instead of the processing of steps S3, S4 illustrated in FIG. 7. That is, when an affirmative determination is made in step S2, the microcomputer 41 performs processing of step S5 and subsequent steps on the condition that the U phase duty value Du is equal to or greater than the first duty determination value D1, and the motor rotation angle θm is in the range of "60°≤θm≤120°" (step S16: YES). When a negative determination is made in step S16, the microcomputer 41 performs processing of step S5 and subsequent steps on the condition that the U phase duty value Du is equal to or less than the second duty determination value D2, and the motor rotation angle θm is in the range of "240°≤θm≤300°" (step S17). In this configuration, it is possible to obtain the effects similar to the effects obtained in the embodiment described above.

In the embodiment described above, the phase current values Iu to Iw are detected, based on the trough reading current values Iv_u to Iv_w and the apex reading current values Im_u to Im_w. However, the method of detecting the phase current values Iu to Iw may be appropriately changed. For example, the apex reading current values Im_u to Im_w may be used as the phase current values Iu to Iw without being changed. However, if the apex reading current values Im_u to Im_w are used as the phase current values Iu to Iw without being changed, there is a possibility that the phase current values Iu to Iw cannot be appropriately detected when the phase duty values Du to Dw are set in the vicinity of the upper limit value. For example, if the U phase duty value Du is set in the vicinity of the upper limit value, the FETs 42u, 43u of the U phase are turned on or off immediately before the apex reading current value Im_u of the U phase is detected. Therefore, noise is included in the apex reading current value Im_u of the U phase that is detected. Thus, if the apex reading current value Im_u of the U phase is used as the U phase current value Iu without being changed, the U phase current value Iu cannot be appropriately detected. If the U phase duty value Du is set in the vicinity of the upper limit value, the U phase current value Iu may be estimated from the apex reading current values Im_v, Im_w of the V phase and the W phase, based on the following Equation (4).

$$Iu = -Im\_v - Im\_w \quad (4)$$

If the V phase duty value Dv or the W phase duty value Dw is set in the vicinity of the upper limit value, the V phase current value Iv and the W phase current value Iw may be estimated from the apex reading current values Im_u to Im_w of the respective phases, according to the following Equations (5), (6).

$$Iv = -Im\_w - Im\_u \quad (5)$$

$$Iw = -Im\_u - Im\_w \quad (6)$$

When the phase current values Iu to Iw are estimated according to Equations (4) to (6), it is possible to detect the phase current values Iu to Iw more accurately, even if the phase duty values Du to Dw are set in the vicinity of the upper limit value.

In the embodiment described above, there is only one triangular wave 6 used for comparison with the phase duty values Du to Dw. Instead of this configuration, in order to avoid occurrence of a through-current due to a so-called arm short circuit, dead time may be provided between the timing of ON/OFF of the FETs 42u to 42w on the power supply side and the timing of ON/OFF of the FETs 43u to 43w on the ground side by using two triangular waves having equal phases shifted vertically.

In the embodiment described above, the FETs 42*u* to 42*w* and 43*u* to 43*w* are employed as the switching elements of the drive circuit 40. However, other appropriate switching elements may be used. The electric power steering system of the embodiment described above is not limited to the electric power steering system in which the assist torque is applied to the steering shaft 11. The electric power steering system of the embodiment can be applied to, for example, an electric power steering system in which the assist torque is applied to the rack shaft 13.

The motor control device 4 of the embodiment described above is not limited to the electric power steering system and can be applied to an appropriate motor control device.

What is claimed is:

1. A motor control device comprising:
   a drive circuit that supplies drive electric power in three phases to a motor, according to turning on or off of switching elements disposed in phase feeding paths for the motor;
   a control unit that computes voltage command values of the three phases for the motor through current feedback control that causes current values of the three phases for the motor to follow current command values corresponding to a target output of the motor, and generates control signals for turning on or off the switching elements, based on the voltage command values of the three phases; and
   an abnormality detecting portion,
   wherein when one of the three phases is set as a specific phase, the abnormality detecting portion determines that a current-carrying failure occurs in the specific phase on a condition that all of (i) a condition that an absolute value of the current value of the specific phase is less than a predetermined first current determination value, (ii) a condition that an absolute value of the voltage command value of the specific phase is equal to or greater than a predetermined voltage command determination value, and (iii) a condition that the voltage command value of the specific phase is deviated from the voltage command values of two phases other than the specific phase are satisfied.

2. The motor control device according to claim 1, wherein the abnormality detecting portion determines whether or not the voltage command value of the specific phase is deviated from the voltage command values of the two phases other than the specific phase, based on whether or not a positive or negative sign of the voltage command value of the specific phase is different from the positive or negative sign of the voltage command values of the two phases other than the specific phase.

3. The motor control device according to claim 1, wherein the abnormality detecting portion determines whether or not the voltage command value of the specific phase is deviated from the voltage command values of the two phases other than the specific phase, based on whether or not absolute values of the current values of the two phases other than the specific phase are less than a predetermined second current determination value.

4. The motor control device according to claim 1, wherein the abnormality detecting portion determines whether or not the voltage command value of the specific phase is deviated from the voltage command values of the two phases other than the specific phase, based on whether or not a rotation angle of the motor is in a predetermined range.

5. The motor control device according to claim 1, wherein the abnormality detecting portion detects the current-carrying failure in the specific phase, on a further condition that an angular velocity of the motor is lower than a predetermined angular velocity determination value.

6. The motor control device according to claim 1, wherein the abnormality detecting portion detects the current-carrying failure in the specific phase, on a further condition that a power supply voltage of the drive circuit is equal to or higher than a predetermined voltage determination value.

* * * * *